(12) United States Patent
Hulbert

(10) Patent No.: US 11,260,807 B2
(45) Date of Patent: Mar. 1, 2022

(54) VEHICLE DOOR PROTECTION DEVICE AND METHOD OF USE

(71) Applicant: Collin Lance Hulbert, Arlington, TX (US)

(72) Inventor: Collin Lance Hulbert, Arlington, TX (US)

( * ) Notice: Subject to any disclaimer, the term of this patent is extended or adjusted under 35 U.S.C. 154(b) by 267 days.

(21) Appl. No.: 16/724,277

(22) Filed: Dec. 21, 2019

(65) Prior Publication Data
US 2020/0238926 A1    Jul. 30, 2020

Related U.S. Application Data

(60) Provisional application No. 62/783,944, filed on Dec. 21, 2018.

(51) Int. Cl.
| | | |
|---|---|---|
| *B60R 13/04* | (2006.01) | |
| *B62D 65/16* | (2006.01) | |
| *B60J 11/06* | (2006.01) | |

(52) U.S. Cl.
CPC ............ *B60R 13/043* (2013.01); *B62D 65/16* (2013.01); *B60J 11/06* (2013.01)

(58) Field of Classification Search
CPC . Y10T 29/49826; B62D 65/16; B60R 13/043; B60R 19/42; B60R 13/04; B60J 11/06
USPC ..................................... 29/428; 150/154, 166
See application file for complete search history.

(56) References Cited

U.S. PATENT DOCUMENTS

| | | | | |
|---|---|---|---|---|
| 3,010,084 A | * | 10/1971 | Richter | B60J 11/06 290/132 |
| 4,643,471 A | * | 2/1987 | Fishback | B60J 11/06 280/770 |
| D342,708 S | * | 12/1993 | Stoeck | D12/167 |
| 5,312,145 A | * | 5/1994 | McNeil | B60J 11/06 29/428 |
| 6,099,067 A | * | 8/2000 | Butterworth | B60J 11/00 135/88.05 |
| D847,442 S | * | 4/2019 | Bikowicz | D30/199 |
| 10,480,832 B2 | * | 11/2019 | Abelon | B04F 5/50 |
| 2007/0108797 A1 | * | 5/2007 | Burleson | B60J 11/06 296/153 |
| 2009/0293198 A1 | * | 12/2009 | Fodge | A47C 31/10 5/653 |
| 2010/0106732 A1 | * | 4/2010 | Atallah et al. | B60R 13/043 |
| 2014/0355110 A1 | * | 12/2014 | Farmer | G03B 21/585 359/443 |
| 2015/0196826 A1 | * | 7/2015 | Fox | A63B 1/0036 206/315.1 |

(Continued)

*Primary Examiner* — Sarang Afzali
*Assistant Examiner* — Darrell C Ford
(74) *Attorney, Agent, or Firm* — Leavitt Eldredge Law Firm

(57) ABSTRACT

A vehicle door protection device includes an exterior casing composed of a material and extending from a top end to a bottom end, the exterior casing having an elastic opening at the bottom end; and a pocket sewn into a back side of the exterior casing; a magnetic strip to secure within the pocket, the magnetic strip having a flexible strip; and one or more magnets secured to the flexible strip; the magnetic strip provides for securement of the vehicle door protection device to a vehicle door; a padding to removably secure within the exterior casing via the elastic opening; the padding provides protection to the door from damage.

8 Claims, 4 Drawing Sheets

(56) References Cited

U.S. PATENT DOCUMENTS

2016/0121706 A1\* 5/2016 Garfield .................. B60J 11/06
 293/128
2021/0053509 A1\* 2/2021 Oko ..................... B60R 13/043

\* cited by examiner

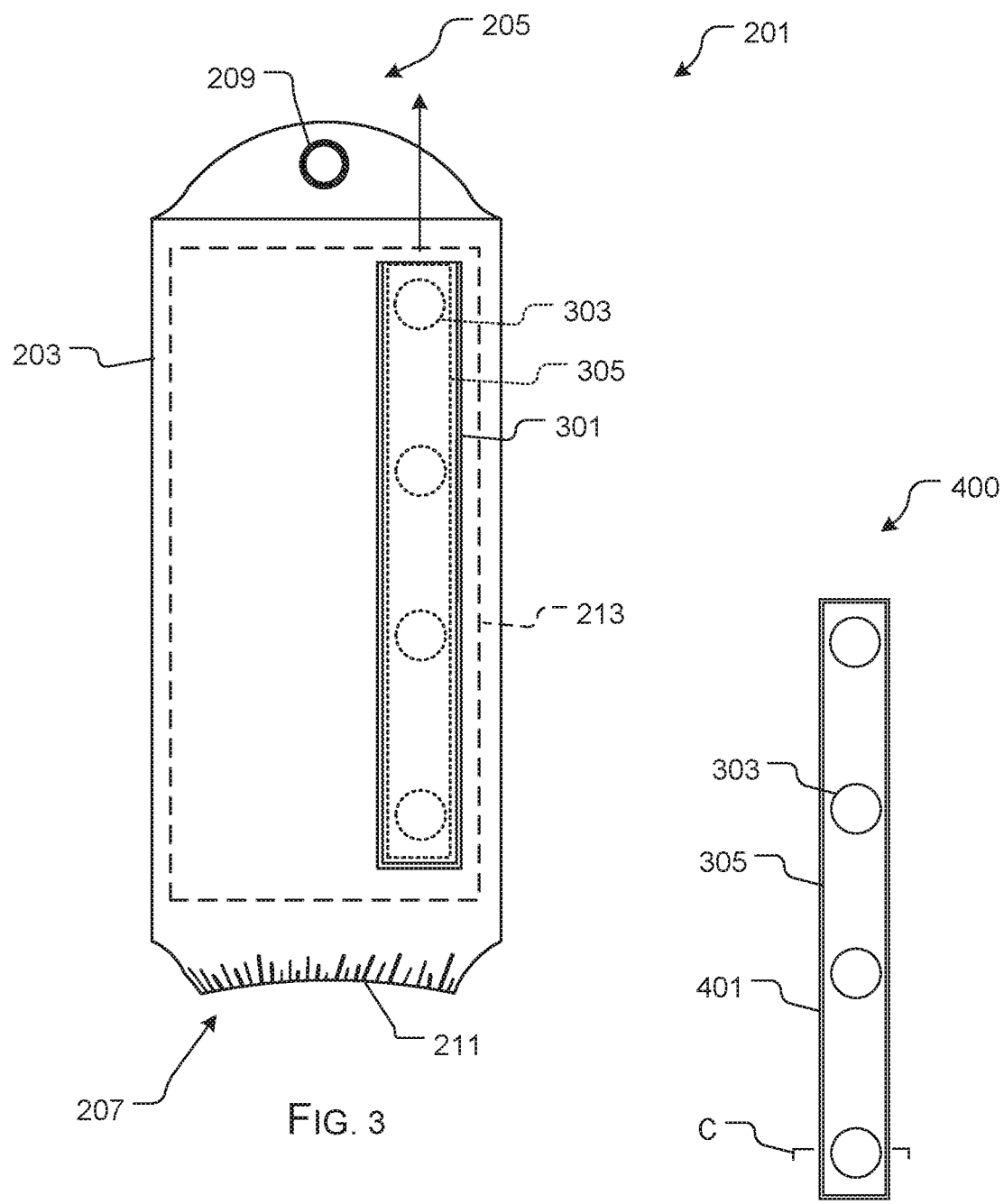
FIG. 3
FIG. 4
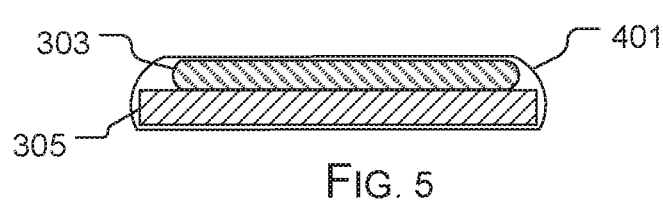
FIG. 5

VEHICLE DOOR PROTECTION DEVICE AND METHOD OF USE

BACKGROUND

1. Field of the Invention

The present invention relates generally to vehicle protection devices, and more specifically, to a vehicle protection device with magnetic attachment and improved padding and exterior casing.

2. Description of Related Art

Damage to vehicles is a common problem experience by drivers, valet attendants, and the like. FIG. 1 depicts a flowchart 101 of a conventional method, wherein one or more vehicles are parked in a lot and thereby exposed to damage from individuals entering the vehicles and the opening of doors into one another, as shown with boxes 103, 105, 107.

It is an object of the present invention to provide a vehicle protection device that includes padding that is easily attached and removed to a vehicle without damage to the vehicle, and thereby provides protection.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is a rear view of the vehicle protection device of FIG. 2;

FIG. 4 is a front view of a magnetic strip of FIG. 3;

FIG. 5 is a cross sectional view of the magnetic strip taken from line C;

Figure 1:
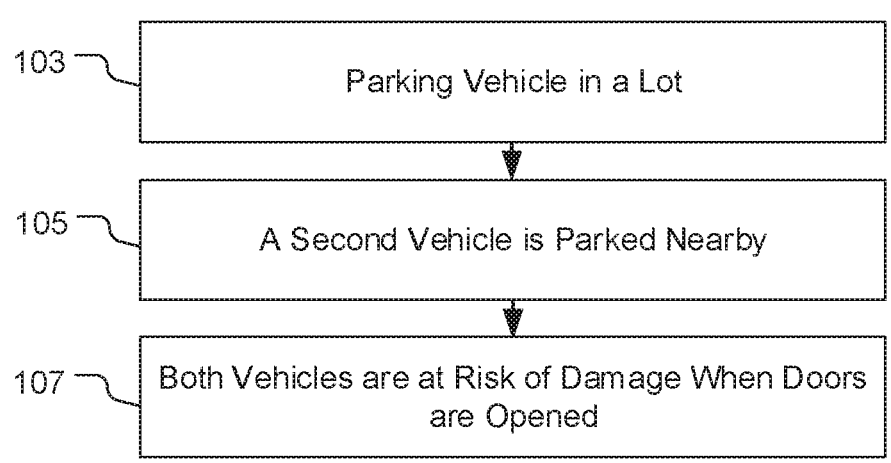
FIG. 1 is a flowchart of a common risk of damage associated with vehicles.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle protection systems. Specifically, the present invention provides a vehicle protection device configured to attach to a vehicle via a magnetic strip and provide protection padding. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
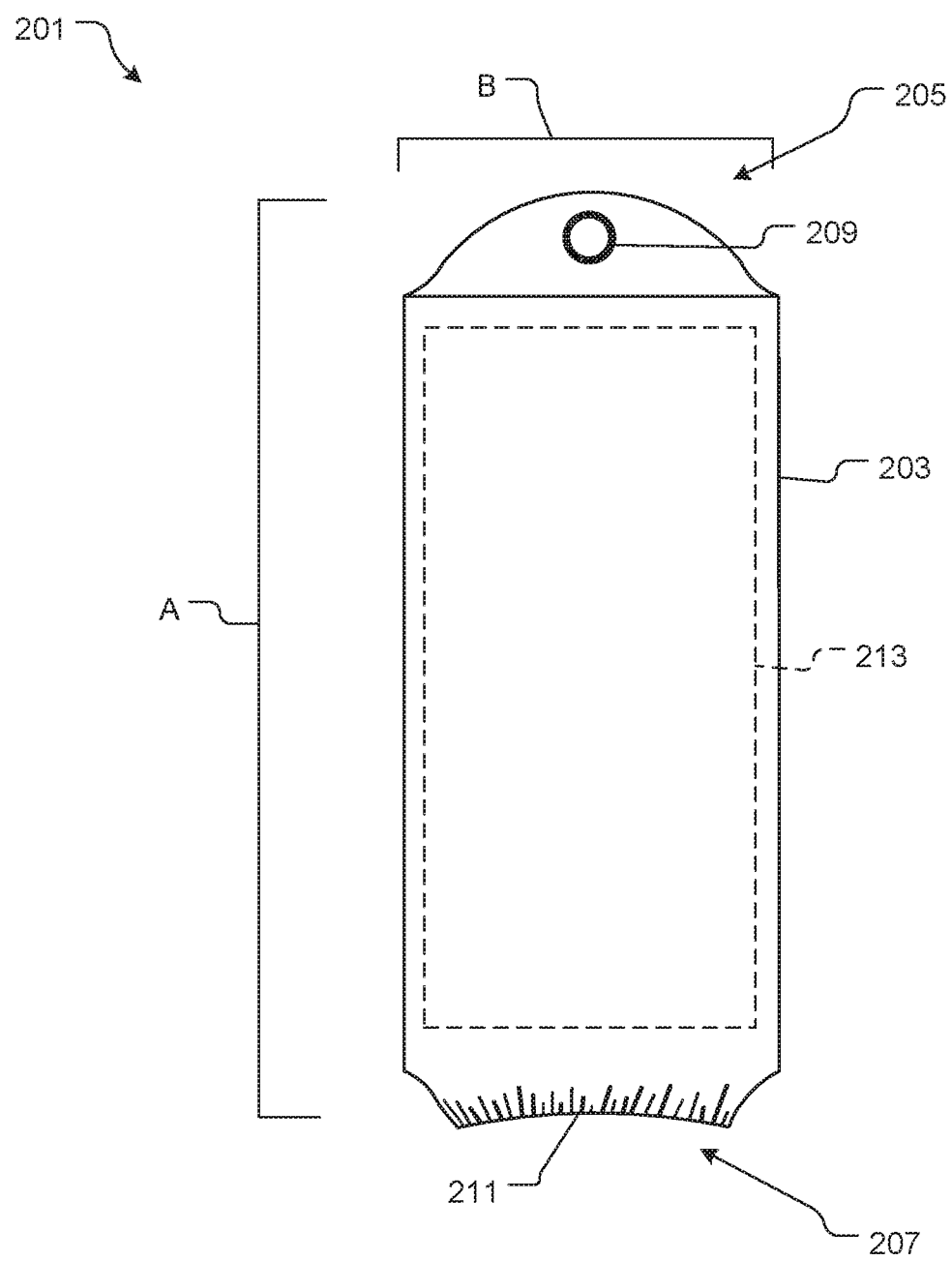
FIG. 2 is a front view of a vehicle protection device in accordance with a preferred embodiment of the present application.

Referring now to the drawings wherein like reference characters identify corresponding or similar elements throughout the several views, FIG. 2 depicts a front view of a vehicle protection device 201 in accordance with a preferred embodiment of the present application. It will be appreciated that device 201 overcomes one or more of the above-listed problems commonly associated with conventional vehicle systems.

In the contemplated embodiment, device 201 includes an exterior casing 203 extending from a top end 205 to a bottom end 207. In the preferred embodiment, the casing 203 is composed of a material, such as a bacteria resistant and water proof material. Further, the material should be soft to avoid scratching and damage to a vehicle. The device 201 can include an opening 209 extending through the casing, and configured to provide a means to secure the device via a hook or other fastener. In the preferred embodiment, the opening 209 is surrounded via a seam, and does not include a grommet, thereby ensuring that the casing remains machine washable.

Device 201 includes a pad an elastic opening 211 which provides access to the interior area of the casing, wherein a padding 213 is removably secured. It should be appreciated that the padding 213 can vary and is removable to again provide for machine washing of the casing.

In the preferred embodiment, device 201 has a length A of approximately 14 inches, a width B of approximately 6 inches, and a depth of approximately 1.4 inches. However, it must be understood that the exact size can vary as desired by aesthetical, functional, or manufacturing considerations.

In FIG. 3, a rear view depicts device 201 wherein a pocket 301 is shown sewn into the casing 203. The pocket 301 is configured to removably receive a magnetic strip 400 having one or more magnets 303 secured to a flexible strip 305. In the preferred embodiment, as shown in FIGS. 4 and 5, the magnets 303 are shrink-wrapped (vacuum sealed) with a plastic 401 to the flexible strip 305. This ensures that the magnets cannot move.

In one embodiment, the flexible strip is composed of a plexiglass material, and the one or more magnets are neodymium disc magnets glued directly to the flexible strip. It should be appreciated that although the magnetic strip is shown with four magnets, the number could change and remain within the scope of the present disclosure.

It should be appreciated that one of the unique features believed characteristic of the present application is the configuration of the magnetic strip into the device, along with the configuration of the padding, which provides for an improved functionality of a vehicle protection device. The device is useful to protect from nearby vehicles, posts, or other possibly damaging items.

Figure 6:
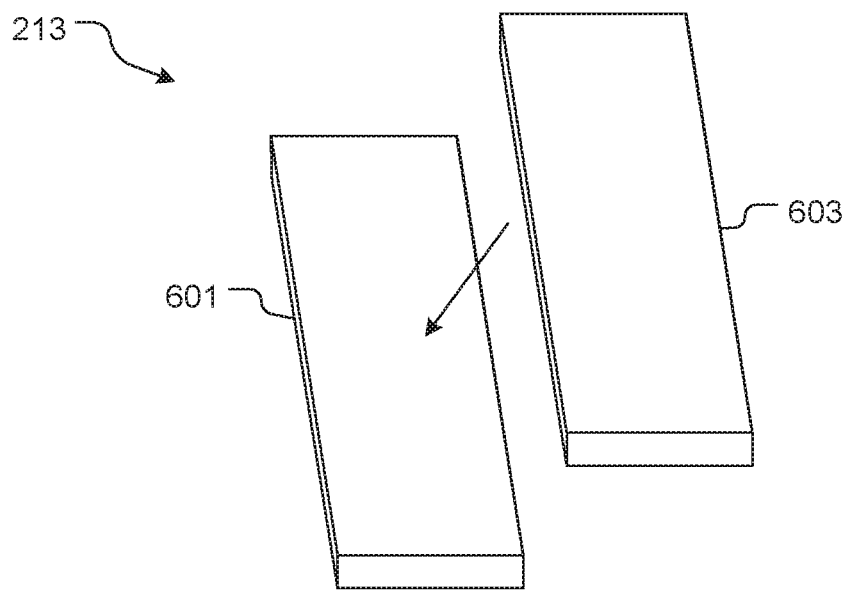
FIG. 6 is an exploded view of a padding of FIGS. 2 and 3.

In FIG. 6, one contemplated embodiment of padding 213 is shown. Padding 213 can comprise two pads 601, 603 each being composed of bacterial resistant foam, such as Microban® pads. The use of multiple pads provides for increased motion and stress relief on the fabric during use.

Figure 7:
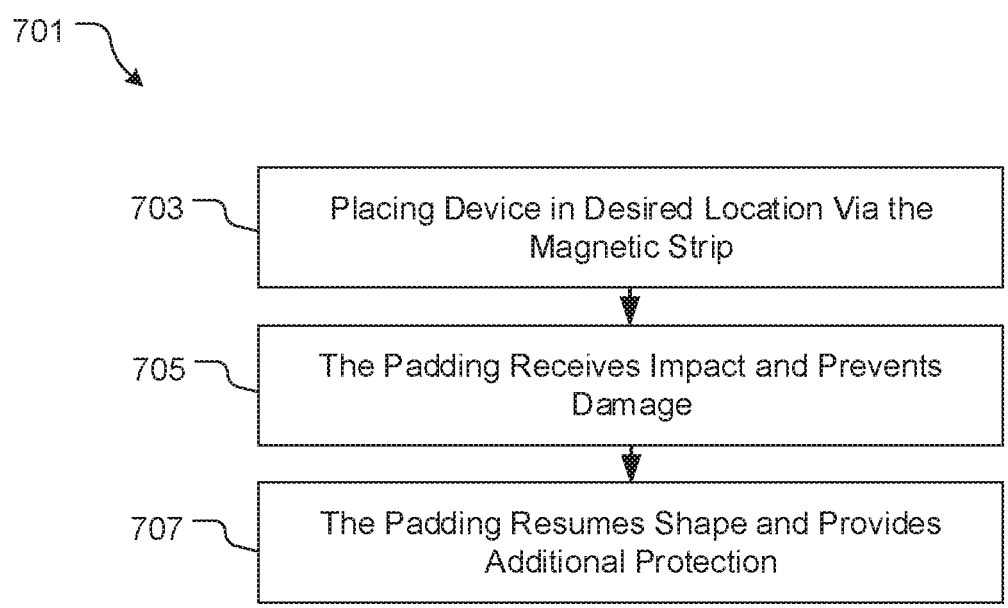
FIG. 7 is a flowchart of a method of use associated with the device of FIG. 2.

In FIG. 7, a flowchart 701 depicts a method of use of device 201. During use, the device is secured in a desired location to a vehicle via the magnetic strip, as shown with box 703. The padding receives impact and prevents damage from being imparted to the vehicle, as shown with box 705. It should be appreciated that the padding resumes its original shape and continues to provide needed protection during use, as shown with box 707.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle door protection device, comprising:
   an exterior casing composed of a material and extending from a top end to a bottom end, the exterior casing having:
      an elastic opening at the bottom end; and
      a pocket sewn into a back side of the exterior casing;
   a magnetic strip configured to secure within the pocket, the magnetic strip having:
      a flexible strip; and
      one or more magnets secured to the flexible strip;
      wherein the magnetic strip provides for securement of the vehicle door protection device to a vehicle door;
   a padding configured to removably secure within the exterior casing via the elastic opening;
   wherein the padding provides protection to the door from damage.

2. The device of claim 1, wherein the padding is two layered pads.

3. The device of claim 1, wherein the flexible strip is a plexiglass strip.

4. The device of claim 1, wherein the one or more magnets are shrink-wrapped to the flexible strip.

5. The device of claim 1, further comprising:
   an opening through the exterior casing, the opening outlined in a seam.

6. The device of claim 1, wherein the material is a PUL waterproof and bacterial resistant fabric.

7. The device of claim 1, wherein the device has a length of approximately 14 inches and a width of approximately 6 inches.

8. A method of protecting a vehicle door, the method comprising:
   providing the device of claim 1;
   securing the device to the vehicle door via the one or more magnets;
   wherein the padding provides protection to the vehicle door.

* * * * *